United States Patent
Xu

(10) Patent No.: US 9,706,334 B2
(45) Date of Patent: Jul. 11, 2017

(54) METHOD FOR SENDING INFORMATION, MTC SERVER, USER EQUIPMENT AND MTC SYSTEM

(71) Applicant: ZTE Corporation, Shenzhen (CN)

(72) Inventor: Hui Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/439,166

(22) PCT Filed: Aug. 13, 2013

(86) PCT No.: PCT/CN2013/081359
§ 371 (c)(1),
(2) Date: Apr. 28, 2015

(87) PCT Pub. No.: WO2014/071758
PCT Pub. Date: May 15, 2014

(65) Prior Publication Data
US 2015/0304796 A1    Oct. 22, 2015

(30) Foreign Application Priority Data
Nov. 6, 2012    (CN) .......................... 2012 1 0438270

(51) Int. Cl.
*H04L 1/00*    (2006.01)
*H04W 4/00*    (2009.01)
(Continued)

(52) U.S. Cl.
CPC ............. *H04W 4/005* (2013.01); *H04W 4/12* (2013.01); *H04W 4/20* (2013.01); *H04W 76/023* (2013.01)

(58) Field of Classification Search
CPC ..... H04W 72/04; H04W 72/05; H04W 72/06; H04W 84/08; H04W 84/09; H04W 84/10
(Continued)

(56) References Cited

U.S. PATENT DOCUMENTS

2013/0100895 A1* 4/2013 Aghili ..................... H04W 4/00
    370/329
2013/0155954 A1* 6/2013 Wang ..................... H04W 4/005
    370/328
(Continued)

FOREIGN PATENT DOCUMENTS

CN    102427604 A    4/2012
CN    102523315 A    6/2012
(Continued)

OTHER PUBLICATIONS

International Search Report for corresponding application PCT/CN2013/081359 filed Aug. 13, 2013; Mail date Nov. 21, 2013.
(Continued)

*Primary Examiner* — Dady Chery
(74) *Attorney, Agent, or Firm* — Cantor Colburn LLP

(57) ABSTRACT

Provided are a method for sending information, a machine type communication (MTC) server, a user equipment and an MTC system. According to the method for sending information, an MTC server or a short message entity (SME) adds triggering identification to information, wherein the triggering identification is used for indicating that the information is triggering information; and the MTC server or the SME sends the information to a user equipment. By means of the technical solution, sending triggering information to a correct application is realized.

18 Claims, 7 Drawing Sheets

(51) Int. Cl.
*H04W 4/12* (2009.01)
*H04W 76/02* (2009.01)
*H04W 4/20* (2009.01)

(58) Field of Classification Search
USPC ........................ 370/329, 229, 230, 341, 351;
455/410–411, 412.1–414.4, 415, 423.3,
455/433, 435.1, 466
See application file for complete search history.

(56) References Cited

U.S. PATENT DOCUMENTS

| | | | | |
|---|---|---|---|---|
| 2013/0265937 | A1* | 10/2013 | Jain ...................... | H04W 4/005 370/328 |
| 2013/0279372 | A1* | 10/2013 | Jain ........................ | H04W 4/06 370/254 |

FOREIGN PATENT DOCUMENTS

| | | |
|---|---|---|
| CN | 102547658 A | 7/2012 |
| EP | 2753106 A1 | 7/2014 |
| WO | 2012142618 A2 | 10/2012 |

OTHER PUBLICATIONS

Research in Motion UK Limited, "Routing a Device Trigger to the target application", SA WG2 Meeting f#93, Oct. 8-12, 2012, Sofia, Bulgaria, pp. 1-4, S2-123810.

"3rd Generation Partnership Project; Technical Specification Group Services and System Aspects; Architecture enhancements to facilitate communications with packet data networks and applications (Release 11)", 3GPP Standard; 3GPP TS 23.682, 3rd Generation, Sep. 2012, vol. 11.2.0, pp. 1-29.

Supplementary European Search Report and Written Opinion issued Nov. 12, 2015 re: Application No. EP 13 85 3033, pp. 1-9.

ZTE: "Discussion and solution on anti fake Tsp trigger attack", 3GPP TSG SA WG3 Meeting #67, , TD S3-120337 May 21-25, 2012, pp. 1-3, Kyoto, Japan.

* cited by examiner

METHOD FOR SENDING INFORMATION, MTC SERVER, USER EQUIPMENT AND MTC SYSTEM

TECHNICAL FIELD

The disclosure relates to the field of communications, and in particular to a method for sending information, an MTC server, a user equipment and an MTC system.

BACKGROUND

Machine to machine (M2M) refers to all techniques and means for connecting machines. The theory of M2M has appeared in the 90s of last century, but was still theoretical. Since 2000, with the development of the mobile communication technology, the networking of a machine with the mobile communication technology has become possible. M2M service has appeared in the market in about 2002, and developed rapidly in the next few years and becomes the focus of various communication device suppliers and telecommunication operators. At present, the amount of machines in the throughout the globe is much larger than that of people, so the M2M technology is quite prospective in market.

Research on the scenario of M2M communication application shows that providing M2M communication over a mobile network has a great potential market. However many new requirements have been proposed for M2M services, and in order to enhance the competitiveness of the mobile network, it is necessary to optimize the existing mobile network to more effectively support M2M communication.

The existing mobile communication network is mainly designed for man-to-man communication, and is not sufficiently optimized for machine-to-machine and man-to-machine communication. In addition, it is also a key to the success of M2M communication deployment that an operator can provide M2M communication services with a low cost.

Based on the above-mentioned situation, it is necessary to study the solution for the mobile network to support M2M communication; and the solution will reuse the existing network to a maximum limit, and reduces the influence on the network by large amount of M2M communication and the complexity of operation and maintenance.

The competition in the current telecommunication market is more and more fierce, and the tariff continuously decreasing; and the human based communication market is tending to be saturated, and M2M is a brand new development opportunity to the operator.

In order to effectively use the mobile network resource, the 3rd generation partnership project (3GPP) has proposed a machine type communication (MTC), i.e. a service of communication from machine to machine, machine to man, the range of service thereof goes far beyond the previous communication of Human to Human (H2H, and MTC differs from the existing H2H communication mode a lot in aspects such as access control, charging, security, Quality of Service (QoS), service mode, etc.

In the architecture of a 3GPP evolved packet system (EPS), the EPS includes a radio access network and a core network. The radio access network may be, for example, a UMTS radio access network (universal terrestrial radio access network, UTRAN), an evolved UTRAN (E-UTRAN), or a GSM/EDGE radio access network (GERAN). As regards the core network, for example, in an evolved packet core network (EPC), there are network elements including a mobile management entity (MME), a serving gateway, and a packet data network (PDN) gateway (PGW); in a GPRS core network, network elements such as a serving GPRS support node (SGSN) are included; and in an E-UTRAN, evolved Node Bs (eNBs) are included.

MTC device trigger is one of the basic requirements for MTC systems. In order to control the communications of an MTC device, the means of an MTC server initiating a poll may be used for communications. As regards the communications initiated by the MTC device, sometimes data also needs to be polled by the MTC server from the MTC device. If the query initiated by the MTC server returns failure or the IP address of the MTC device is unavailable, then the MTC server may use MTC device trigger to establish communication with the MTC device. If a network cannot trigger the MTC device, then the network reports an MTC device trigger failure to the MTC server. The MTC device trigger is implemented in 3GPP by means of control plane signalling.

The MTC device trigger includes mobile originated (MO) and mobile terminating (MT) services, i.e. including the MTC device sending or receiving information.

In order to implement effective transmission of an MTC device trigger request, the proposed schemes include: sending MTC device triggering information by means of a short message service (SMS), or sending MTC device triggering information by means of control plane signalling. With regard to the means of sending the MTC device triggering information by means of control plane signalling, the MTC server sends control plane signalling containing the MTC device triggering information to a network node, and the network node parses the MTC device triggering information in the control plane signalling, and then sends the MTC device triggering information to a user equipment (UE).

FIG. 1 is a schematic diagram showing the MTC architecture in 3GPP according to related art. As shown in FIG. 1, at the user plane, an MTC application device (Application) connected with an MTC user is in communication with an MTC server via an API interface, or is in direct communication with a gateway GPRS support node (GGSN)/PGW in a 3GPP network via a Gi/SGi interface. The MTC server is in communication with the GGSN/PGW via a Gi/SGi interface. The GGSN/PGW is in communication with a UE via a radio access network (RAN). At the control plane, the MTC server sends control plane signalling containing MTC device triggering information to an MTC interworking function (MTC-IWF) via a Tsp interface, or an SME sends control plane signalling containing MTC device triggering information to a short message service-service centre (SMS-SC)/IP-short-message-gateway (IP-SM-GW) via a Tsms interface. The MTC-IWF sends, via T5, the triggering information to an MME/SGSN/MSC, which then sends the triggering information to the UE; or the MTC-IWF sends, via T4, the triggering information to the SMS-SC, which then sends the triggering information to the UE.

FIG. 2 is a schematic diagram showing an MTC-IWF sending control plane signalling containing MTC device triggering information via a T4 interface according to related art. As shown in FIG. 2, the MTC-IWF directly sends an SMS containing the MTC device triggering information to an SMS-SC via a T4 interface to transmit the MTC device triggering information, and the SMS-SC finally sends the SMS to a UE. The UE sends an acknowledgement message to an MTC server via a network node; and if the trigger is successful, the UE establishes a connection with the MTC server for communication. In order to distinguish SMS triggering information from common SMS information, an SMS application port ID 49152 is utilized to indicate the SMS triggering information, i.e. after the MTC-IWF has received MTC triggering information from an SCS, the MTC-IWF adds a port ID 49152 to the triggering information to indicate the SMS triggering information, and sends the SMS triggering information to a target UE by means of a T4 flow. The target UE judges that the received short message is triggering information according to the ID 49152 in the SMS, and forwards the SMS triggering information to a corresponding application for processing.

At present, in the MTC triggering information flow in 3GPP, at least the following problems exist: if there are a plurality of different application servers (ASs) sending triggering information, the UE cannot identify the corresponding application and forward the triggering information to the corresponding application for processing according to the existing scheme; and when there is triggering information for non-MTC application, the UE likewise cannot identify an application corresponding to the short message triggering information according to the existing scheme, and therefore the requirement of sending MTC device triggering information to a correct application for processing cannot be met.

SUMMARY

With regard to the problem that triggering information cannot be sent to a correct application in the related art, the embodiments of the disclosure provide a method for sending information, an MTC server, a user equipment and an MTC system so as to at least solve the problems mentioned above.

According to one aspect of the embodiments of the disclosure, a method for sending information is provided, including: adding, by an MTC server or an SME, triggering identification to information, wherein the triggering identification is used for indicating that the information is triggering information; and sending, by the MTC server or the SME, the information to a user equipment.

In an example embodiment, information indicated by the triggering identification further includes at least one of the following: indicating an application type triggered by the information, wherein the application type includes: MTC application and non-MTC application; indicating one or more applications triggered by the information; and indicating to trigger charging.

In an example embodiment, the triggering identification includes at least one of the following: one or more application port number identifications of one or more applications triggered by the information; one or more protocol identifications of one or more applications triggered by the information; and one or more application identifications of one or more applications triggered by the information.

In an example embodiment, sending, by the MTC server, the information to the user equipment includes: sending, by the MTC server, the information to an MTC-IWF by carrying the information in a short message or control plane signalling; determining, by the MTC-IWF, that the information is triggering information; and sending, by the MTC-IWF, the information to the user equipment via a T4 interface and/or a T5 interface.

In an example embodiment, sending, by the SME, the information to the user equipment includes: sending, by the SME, the information to the user equipment via a Tsms interface by carrying the information in a short message.

In an example embodiment, the method further includes: receiving, by the user equipment, the information; and processing, by the user equipment, the information according to the triggering identification.

In an example embodiment, processing, by the user equipment, the information according to the triggering identification includes: sending, by the user equipment, the information to one or more applications corresponding to the information according to the triggering identification; and conducting, by the user equipment, communication with the MTC server or the SME according to the triggering information carried in the information.

According to another aspect of the embodiments of the disclosure, a method for forwarding information is provided, including: receiving, by an MTC-IWF, information carrying triggering identification, wherein the triggering identification is used for indicating that the information is triggering information; determining, by the MTC-IWF, that the information is triggering information according to the triggering identification; and forwarding, by the MTC-IWF, the information to a network filtering element, wherein the network filtering element is configured to determine whether a machine type communication (MTC) server or a short message entity (SME) sending the information has authorized sending the triggering information.

In an example embodiment, information indicated by the triggering identification further includes at least one of the following: indicating an application type triggered by the information, wherein the application type includes: MTC application and non-MTC application; indicating one or more applications triggered by the information; and indicating to trigger charging.

In an example embodiment, the network filtering element includes at least one of the following: a short message service-service centre (SMS-SC), a GMSC, a short message service router (SMS Router) and a dedicated network entity.

In an example embodiment, the triggering identification includes at least one of the following: one or more application port number identifications of one or more applications triggered by the information; one or more protocol identifications of one or more applications triggered by the information; and one or more application identifications of one or more applications triggered by the information.

According to another aspect of the embodiments of the disclosure, an MTC server is provided, including: an adding component configured to add triggering identification to information, wherein the triggering identification is used for indicating that the information is triggering information; and a sending component configured to send the information to a user equipment.

In an example embodiment, the adding component includes at least one of the following: a first adding element configured to carry, in the information, one or more application port number identifications used for indicating one or more applications triggered by the information; a second adding element configured to carry, in the information, one or more protocol identifications used for indicating one or more applications triggered by the information; and a third adding element configured to carry, in the information, one or more application identifications used for indicating one or more applications triggered by the information.

According to one more aspect of the embodiments of the disclosure, a user equipment is provided, including: a determining component configured to determine, according to triggering identification carried in received information, that the information is triggering information; and a forwarding component configured to forward the information to one or more applications on the user equipment according to the triggering identification, wherein an application type includes: MTC application and non-MTC application.

In an example embodiment, the forwarding component includes: a first forwarding element configured to forward the information to an application type indicated by the triggering identification; or a second forwarding element configured to forward the information to one or more applications indicated by the triggering identification.

According to yet one aspect of the embodiments of the disclosure, an MTC system is provided, including: an MTC server and/or an SME configured to send information carrying triggering identification indicating that the information is triggering information; and a user equipment configured to receive the information, determine that the information is triggering information according to the triggering identification, and forward the information to one or more applications on the user equipment according to the triggering identification.

In an example embodiment, the user equipment is configured to forward the information to an application type indicated by the triggering identification, or forward the information to one or more applications indicated by the triggering identification; and conduct communication with the MTC server or the SME according to the triggering information carried in the information.

In an example embodiment, the system further includes: a network filtering element configured to verify whether the MTC server or the SME sending the information has authorized sending the triggering information.

By means of the embodiments of the disclosure, the MTC server or the SME adds, to information, triggering identification used for indicating that the information is triggering information, and sends the information to a user equipment, thereby sending triggering information to a correct application.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the accompanying drawings.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

According to an embodiment of the disclosure, an MTC system is provided. A triggering identification used for indicating that the information is triggering information is carried in the information, so as to send the triggering information to a correct application.

Figure 3:
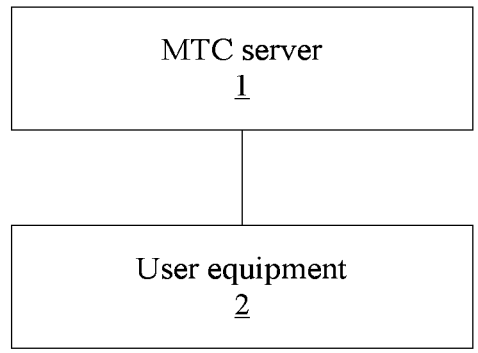
FIG. 3 is a schematic diagram of an MTC system according to an embodiment of the disclosure.

FIG. 3 is a schematic diagram of an MTC system according to an embodiment of the disclosure. As shown in FIG. 3, the system mainly includes: an MTC server 1 configured to send information carrying triggering identification indicating that the information is triggering information; and a user equipment 2 configured to receive the information, determine that the received information is triggering information according to the triggering identification, and forward the information to one or more applications on the user equipment 2 according to the triggering identification.

By means of the embodiment of the disclosure, the MTC server 1 carries, in information, triggering identification indicating that the information is triggering information, and sends the information, and the user equipment 2 receives the information, determines that the received information is triggering information according to the triggering identification, and forwards the information according to the triggering identification, thereby sending the triggering information to a correct application.

In one implementation of the embodiment of the disclosure, the triggering identification is also used for indicating an application type triggered by the information, wherein the application type includes MTC application and non-MTC application. The user equipment 2 may be configured to determine an application type triggered by the received information according to the triggering identification.

In another implementation of the embodiment of the disclosure, the triggering identification is further used for indicating one or more applications triggered by the information. The user equipment 2 is configured to forward the information to an application type indicated by the triggering identification, or forward the information to one or more applications indicated by the triggering identification.

In an example embodiment, the triggering identification may include but is not limited to at least one of the following: one or more application port number identifications of one or more applications triggered by the information; one or more protocol identifications of one or more applications triggered by the information; and one or more application identifications of one or more applications triggered by the information. In practical applications, different applications or application types may correspond to different port identifications, protocol identifications and application identifications.

For example, the MTC server 1 may carry, in the information, one or more application port identifications of one or more applications triggered by the information, and the user equipment 2 may determine that the information is triggering information according to the one or more application port identifications, determine an application type triggered by the information according to the one or more application port identifications, and forward the information according to the one or more application port identifications. If MTC application is triggered, the information is forwarded to one or more MTC applications for processing, and if non-MTC application is triggered, the information is forwarded to one or more non-MTC applications for processing. If different applications correspond to different application port identifications, the user equipment 2 may also forward the information to the specific one or more applications indicated by the one or more application port identifications.

Or, the MTC server 1 may carry, in the information, one or more protocol identifications of one or more applications triggered by the information, and the user equipment 2 may determine that the information is triggering information according to the one or more protocol identifications, determine an application type triggered by the information according to the one or more protocol identifications, and forward the information according to the one or more protocol identifications.

In one implementation of the embodiment of the disclosure, the system may further include: a network filtering element configured to verify whether the MTC server or the SME sending the information has authorized sending the triggering information. The MTC-IWF receives the information carrying the triggering identification, wherein the triggering identification is used for indicating that the information is triggering information, determines that the information is triggering information according to the triggering identification, and forwards the information to a network filtering element, wherein the network filtering element verifies whether an MTC server or an SME sending the information has authorized sending the triggering information. The network filtering element includes but is not limited to at least one of the following: an SMS-SC, a gateway mobile switching centre (GMSC), a short message service router (SMS Router) and a dedicated network entity.

Corresponding to the system above, according to embodiments of the disclosure, an MTC server and a user equipment are further provided. The implementation of an example MTC server 1 and user equipment 2 of the embodiments of the disclosure will be described below.

Figure 4:
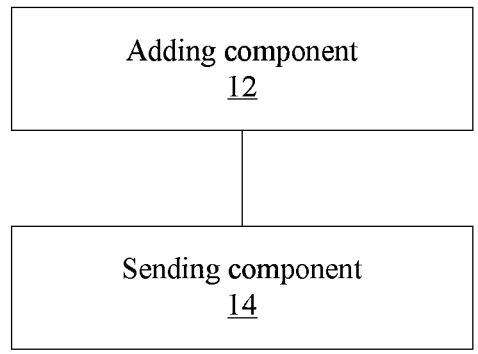
FIG. 4 is a structural block diagram of an example MTC server according to an embodiment of the disclosure.

FIG. 4 is a structural block diagram of an example MTC server according to an embodiment of the disclosure. As shown in FIG. 4, the MTC server mainly includes: an adding component 12 and a sending component 14. The adding component 12 is configured to carry, in information, triggering identification used for indicating that the information is triggering information; and the sending component 14 is coupled to the adding component 12 and configured to send the information mentioned above to a user equipment.

By means of the embodiment of the disclosure, the adding component 12 adds, to the information, the triggering identification used for indicating that the information is triggering information, and the sending component 14 sends the information, and indicates to a user equipment that the information is triggering information, thereby sending the triggering information to a correct application.

In one implementation of the embodiment of the disclosure, information indicated by the triggering identification mentioned above further includes but is not limited to one of the following: an application type triggered by the information, wherein the application type includes MTC application and non-MTC application; and one or more applications triggered by the information. In an example embodiment, the triggering identification may include but is not limited to at least one of the following: one or more application port number identifications of one or more applications triggered by the information; one or more protocol identifications of one or more applications triggered by the information; and one or more application identifications of one or more applications triggered by the information.

Figure 5:
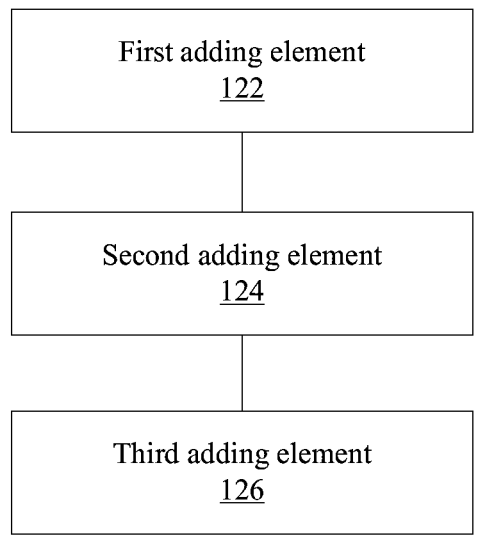
FIG. 5 is a structural block diagram of an example adding component according to an embodiment of the disclosure.

FIG. 5 is a structural block diagram of an example adding component according to an embodiment of the disclosure. As shown in FIG. 5, the adding component 12 includes at least one of the following: a first adding element 122 configured to carry, in the information, one or more application port number identifications used for indicating one or more applications triggered by the information; a second adding element 124 configured to carry, in the information, one or more protocol identifications used for indicating one or more applications triggered by the information; and a third adding element 126 configured to carry, in the information, one or more application identifications used for indicating one or more applications triggered by the information.

Figure 6:
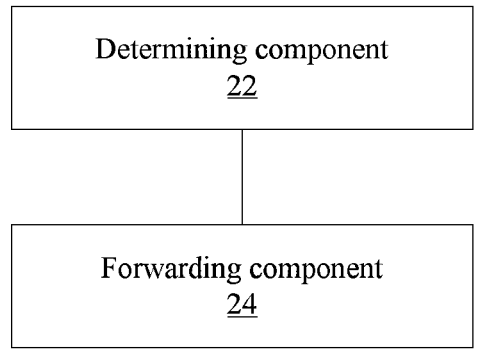
FIG. 6 is a structural block diagram of a user equipment according to an embodiment of the disclosure.

FIG. 6 is a structural block diagram of a user equipment according to an embodiment of the disclosure. As shown in FIG. 6, the user equipment 2 mainly includes: a determining component 22 and a forwarding component 24. The determining component 22 is configured to determine, according to triggering identification carried in received information, that the received information is triggering information; and the forwarding component 24 is coupled to the determining component 22 and is configured to forward the information to one or more applications on the user equipment according to the triggering identification, wherein an application type includes: MTC application and non-MTC application.

By means of the embodiment of the disclosure, the determining component 22 determines, according to triggering identification carried in received information, that the received information is triggering information, and the forwarding component 24 forwards the information to one or more applications on the user equipment according to the triggering identification, thereby sending the triggering information to the correct application.

In one implementation of the embodiment of the disclosure, information indicated by the triggering identification mentioned above further includes but is not limited to: one or more applications triggered by the information. In the case where the triggering identification indicates that the information is triggering information, the determining component 22 is configured to determine that the information is triggering information according to the triggering identification.

Figure 7:
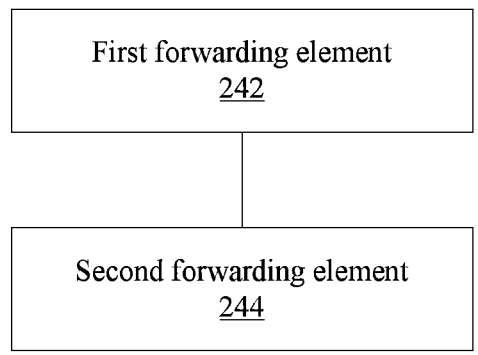
FIG. 7 is a structural block diagram of an example forwarding component according to an embodiment of the disclosure.

FIG. 7 is a structural block diagram of an example forwarding component according to an embodiment of the disclosure. As shown in FIG. 7, the forwarding component 24 may include: a first forwarding element 242 configured to forward the information to an application type indicated by the triggering identification; or a second forwarding element 244 configured to forward the information to one or more applications indicated by the triggering identification.

In practical applications, the triggering identification may include but is not limited to at least one of the following: one or more application port number identifications of one or more applications triggered by the information; one or more protocol identifications of one or more applications triggered by the information; and one or more application identifications of one or more applications triggered by the information.

For example, the determining component 22 may determine that the information is triggering information according to the one or more application port identifications, and the first forwarding element 242 determines an application type triggered by the information according to the one or more application port identifications, and forwards the information according to the one or more application port identifications. If MTC application is triggered, the information is forwarded to one or more MTC applications for processing, and if non-MTC application is triggered, the information is forwarded to one or more non-MTC applications for processing. If different applications correspond to different application port identifications, the second forwarding element 244 may forward the information to the specific one or more applications indicated by the one or more application port identifications.

Or, the determining component 22 may determine that the information is triggering information according to one or more protocol identifications, and the first forwarding element 242 determines an application type triggered by the information according to the one or more protocol identifications, and forwards the information according to the one or more protocol identifications.

According to the embodiments of the disclosure, a method for sending information and a method for forwarding information are further provided, so as to implementation the identification of information in the system or device mentioned above.

Figure 8:
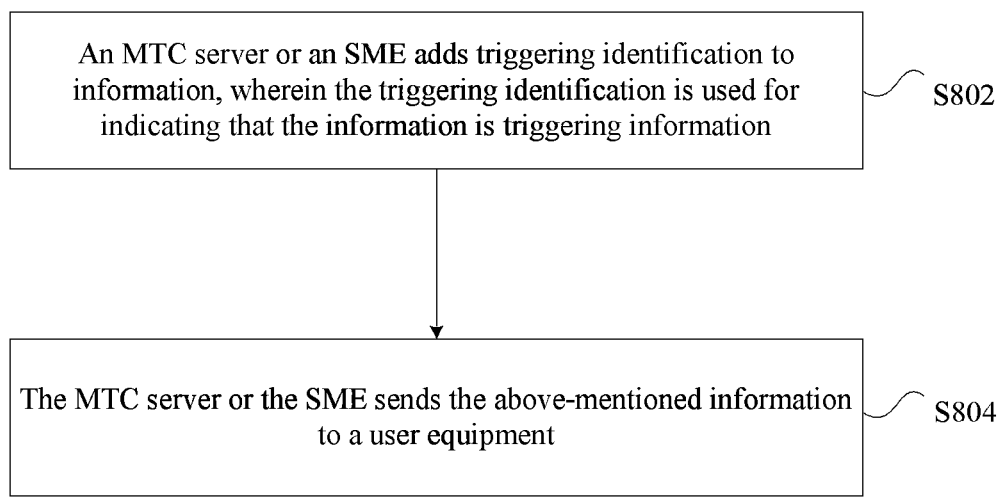
FIG. 8 is a flowchart of a method for sending information according to an embodiment of the disclosure.

FIG. 8 is a flowchart of a method for sending information according to an embodiment of the disclosure. As shown in FIG. 8, the method mainly includes step S802 to step S804:

step S802, an MTC server or an SME adds triggering identification to information, wherein the triggering identification is used for indicating that the information is triggering information; and step S804, the MTC server or the SME sends the information to a user equipment.

By means of the embodiment of the disclosure, the MTC server or the SME carries, in the information, triggering identification used for indicating that the information is triggering information, and sends the information to indicate to a user equipment that the information is triggering information, thereby sending the triggering information to a correct application.

In one implementation of the embodiment of the disclosure, information indicated by the triggering identification mentioned above further includes but is not limited to at least one of the following: indicating an application type triggered by the information, indicating one or more applications triggered by the information; and indicating to trigger charging.

In an example embodiment, the triggering identification may include but is not limited to at least one of the following: one or more application port number identifications of one or more applications triggered by the information; one or more protocol identifications of one or more applications triggered by the information; and one or more application identifications of one or more applications triggered by the information.

In practical applications, an MTC server, e.g. a service capability server (SCS), may send the information to an MTC-IWF by carrying the information in a short message or control plane signalling. The MTC-IWF determines that the information is triggering information, e.g. determining that the information is triggering information according to triggering identification; and the MTC-IWF sends the information to a user equipment via a T4 interface and/or a T5 interface. Or, an SME may carry the information in a short message, and send the short message to a user equipment via a Tsms interface.

Furthermore, the method above may further include: receiving, by a user equipment, the information above; and processing the information according to the triggering identification. In an example embodiment, processing, by the user equipment, the information according to the triggering identification may include: sending, by the user equipment, the information to one or more applications corresponding to the information according to the triggering identification; and conducting, by the user equipment, communication with the MTC server or the SME according to the triggering information carried in the information.

Figure 9:
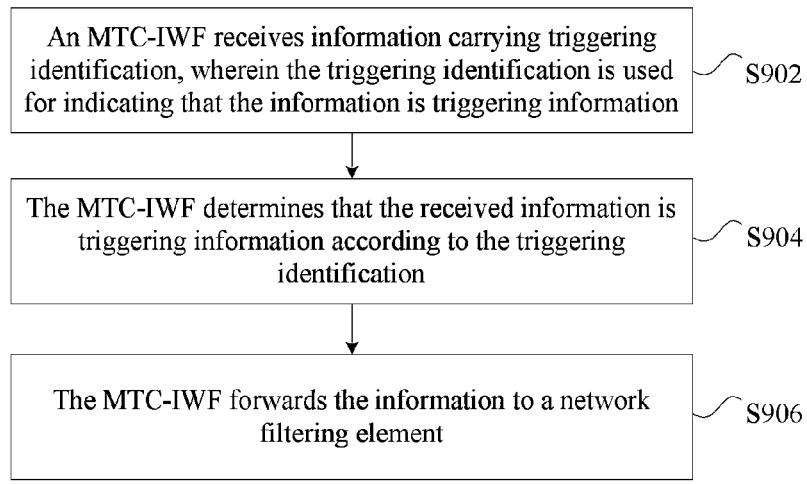
FIG. 9 is a flowchart of a method for forwarding information according to an embodiment of the disclosure.

FIG. 9 is a flowchart of a method for forwarding information according to an embodiment of the disclosure. As shown in FIG. 9, the method mainly includes step S902 to step S904:

step S902, an MTC-IWF receives information carrying triggering identification, wherein the triggering identification is used for indicating that the information is triggering information;

step S904, the MTC-IWF determines that the received information is triggering information according to the triggering identification; and step S906, the MTC-IWF forwards the information to a network filtering element, wherein the network filtering element is configured to determine whether an MTC server or an SME sending the information has authorized sending the triggering information.

By means of the embodiment of the disclosure, the MTC-IWF receives information carrying triggering identification used for indicating that the information is triggering information, and determines that the received information is triggering information according to the triggering identification, and the MTC-IWF forwards the information to the network filtering element, thereby sending the triggering information to a correct application.

Corresponding to the method for sending information mentioned above, information indicated by the triggering identification further includes but is not limited to at least one of the following: indicating an application type triggered by the information, wherein the application type includes: MTC application and non-MTC application; indicating one or more applications triggered by the information; and indicating to trigger charging. In an example embodiment, the triggering identification may include but is not limited to at least one of the following: one or more application port number identifications of one or more applications triggered by the information; one or more protocol identifications of one or more applications triggered by the information; and one or more application identifications of one or more applications triggered by the information.

In one implementation of the embodiment of the disclosure, the network filtering element includes but is not limited to at least one of the following: an SMS-SC, a GMSC, an SMS Router, and a dedicated network entity.

In one implementation of the embodiment of the disclosure, the information is forwarded according to the triggering identification carried in the information and used for indicating an application type triggered by the information, the forwarding procedure including: forwarding the information to an application type indicated by the triggering identification; or, forwarding the information to one or more applications indicated by the triggering identification.

In practical applications, the information may be determined as triggering information according to one or more application port identifications, and an application type triggered by the information may also be determined according to the one or more application port identifications, and the information is forwarded according to the one or more application port identifications. If MTC application is triggered, the information is forwarded to one or more MTC applications for processing, and if non-MTC application is triggered, the information is forwarded to one or more non-MTC applications for processing. If different applications correspond to different application port identifications, the information may be forwarded to one or more applications indicated by the one or more application port identifications. The information may be determined as triggering information according to one or more protocol identifications, and an application type triggered by the information is determined according to the one or more protocol identifications, and the information is forwarded according to the one or more protocol identifications.

Figure 1:
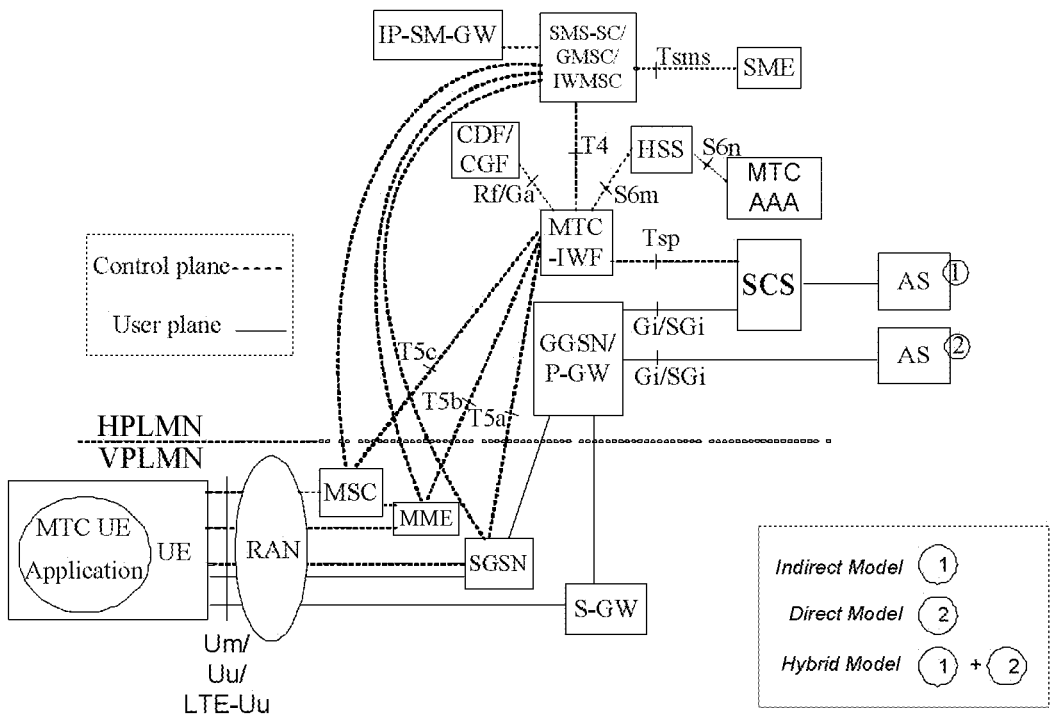
FIG. 1 is a schematic diagram showing the MTC architecture in 3GPP according to related art.
Figure 2:
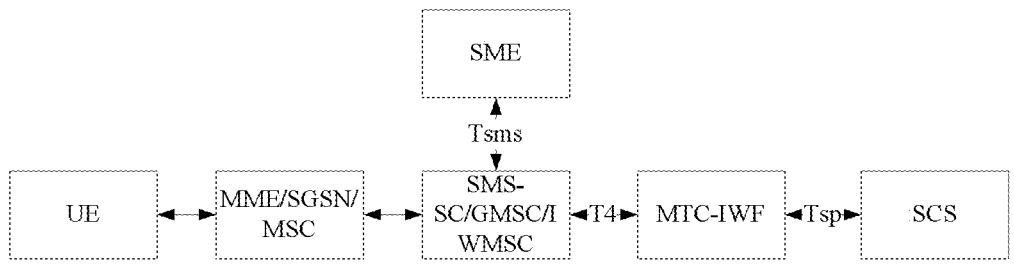
FIG. 2 is a schematic diagram showing an MTC-IWF sending control plane signalling containing MTC device triggering information via a T4 interface according to related art.

The implementation of the example embodiments of the solution above in an MTC architecture as shown in FIG. 1 will be taken as an example to describe the solution of the embodiments of the disclosure.

In this example implementation, an MTC server SCS contains triggering identification in triggering information, and sends the triggering information to an MTC-IWF. The MTC-IWF determines that the information is triggering information according to the triggering identification, and forwards the triggering information to a target user equipment. The target user equipment receives the triggering information, and forwards the triggering information to one or more corresponding applications for processing according to the indication information.

The method and system of the embodiments of the disclosure will be described below.

Figure 10:
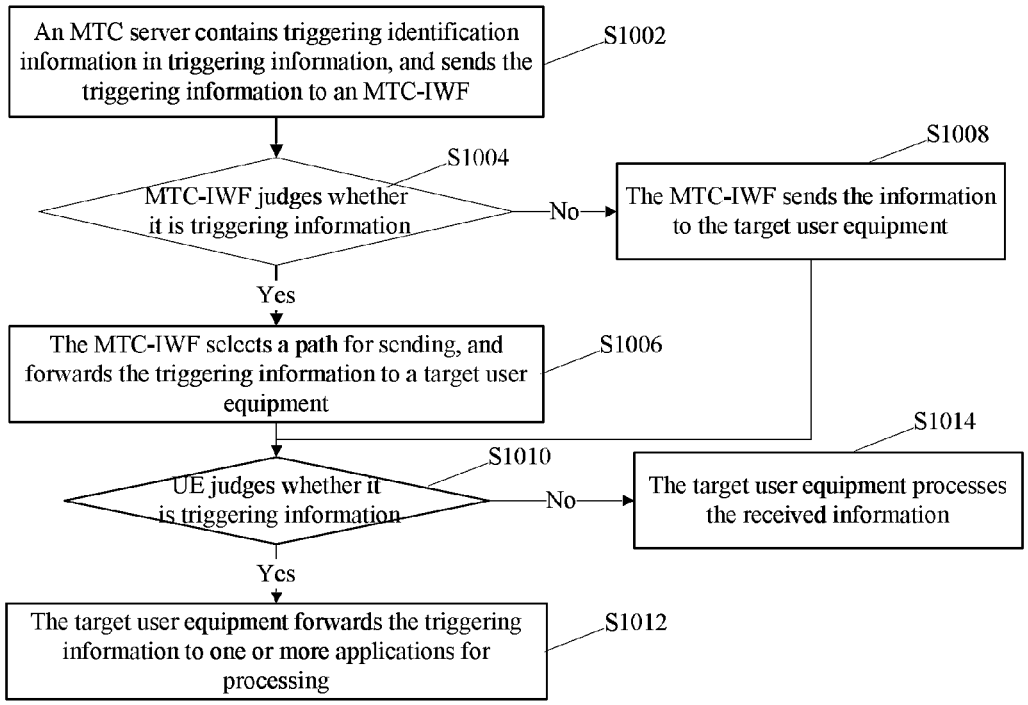
FIG. 10 is a flowchart of a method for identifying MTC device triggering information according to an embodiment of the disclosure.

FIG. 10 is a flowchart of a method for identifying MTC device triggering information according to an embodiment of the disclosure. As shown in FIG. 10, the method includes step S1002 to step S1014.

Step S1002, an MTC server adds triggering identification to triggering information, and sends the triggering information added with the triggering identification to an MTC-IWF. In the MTC architecture as shown in FIG. 1, the MTC server is a service capacity server (SCS).

The triggering identification mentioned above is used for indicating that the information is MTC triggering information, and may specifically be any of the following: one or more application port identifications, one or more protocol identifications, and one or more application identifications. There may be multiple application port identifications, multiple protocol identifications and multiple application identifications respectively. In addition to indicating triggering information, the triggering identification may further be used for indicating different applications (such as MTC application and non-MTC application) on the MTC device, and meanwhile may also be used for triggering charging.

The content of the triggering information may include: an MTC device external ID, an MTC device trigger validity period, and triggering identification. Furthermore, the content of the MTC device triggering information may further include at least one of the following: the priority of the MTC device triggering information, an MTC server identification, an MTC device trigger reference number, a triggering payload, etc.

The MTC device external ID is used for identifying a target user equipment. A 3GPP network internal ID corresponding to the MTC device external ID is IMSI. The mapping between the external ID and the internal ID may be accomplished by the MTC-IWF. Furthermore, in order to achieve MTC device trigger for a plurality of target user equipments, the MTC device ID may also be a group ID. The MTC device trigger validity period is used for indicating the period within which a network node saves the MTC device triggering information. The priority of the MTC device triggering information is used for representing whether the MTC device triggering information is urgent or ordinary. The MTC server ID is used for identifying the SCS initiating the MTC device triggering information. The MTC device trigger reference number is used for indicating whether it is repeated trigger request information. The MTC triggering payload is used for carrying contents relevant to triggering an application, such as indicating a response method of the user equipment, and the MTC triggering payload is transparent to the 3GPP network node, i.e. only the target user equipment can read corresponding contents.

The MTC-IWF is located in a home network. As shown in FIG. 1, the MTC server SCS is coupled with the MTC-IWF via a Tsp interface; the SME is coupled with the SMS-SC via a Tsms interface; the MTC-IWF is coupled with the SMS-SC via a T4 interface; and the MTC-IWF is coupled with the MME/SGSN/MSC via a T5 interface.

It should be noted that this step may also be implemented by sending, by the SME, triggering information to the SMS-SC via a Tsms interface, and containing triggering identification in the triggering information.

Step S1004, the MTC-IWF judges whether the information is triggering information; if so, turn to step S1006; otherwise, turn to step S1008.

The MTC-IWF may judge whether the information is triggering information according to the triggering identification; if the information is triggering information, the MTC-IWF selects a method for sending triggering information; and if the information is not triggering information, the MTC-IWF sends information to a user equipment according to a flow of sending ordinary information.

Step S1006, the MTC-IWF selects a path for sending triggering information, and forwards the MTC device triggering information to a target user equipment. Selecting a path for sending may be selecting, by the MTC-IWF, a T5 interface or a T4 interface to send triggering information.

In an example embodiment, the steps above may further include: judging, by the MTC-IWF, whether the SCS in the triggering information is a server which authorizes sending triggering information to a target MTC device, and generating, by the MTC-IWF, charging data records (CDR) according to the triggering identification and sending the CDR to a charging system.

If the MTC-IWF succeeds or fails to send the triggering information, the SCS is notified of a triggering success or failure (including a failure reason).

Step S1008, the MTC-IWF sends the received information to the target user equipment. The information may be MTC triggering information or non-MTC triggering information, and the MTC-IWF sends the information to the UE.

Step S1010, the target user equipment judges whether the received information is triggering information; if so, turn to step S1012; otherwise, turn to step S1014.

In an example embodiment, the target user equipment judges whether the information is triggering information according to the triggering identification.

Step S1012, the user equipment forwards the triggering information to one or more applications, and the flow ends.

The UE reads the triggering identification in the triggering information, and forwards the triggering information to one or more corresponding applications according to the triggering identification; and the one or more applications process the received triggering information, such as generating application data, or performing communication with an application server. If the UE fails to receive the triggering information since, e.g. the UE memory is full, a trigger failure message is sent to the MTC server.

In practical applications, in order to conduct communication with the MTC server, the user equipment may request to establish a PDN connection or activate packet data protocol (PDP) context (PDN connection/PDP context). If the PDN connection already exists, there is no need to re-establish the PDN connection.

Step S1014, the user equipment processes the received information, and the flow ends. The information is not MTC triggering information, and the UE may process the information according to demands.

Figure 11:
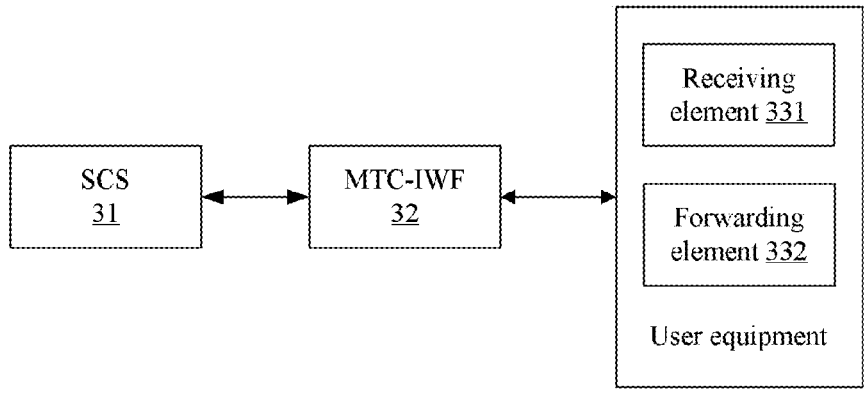
FIG. 11 is a schematic diagram of a system for identifying triggering information according to an embodiment of the disclosure.

According to an embodiment of the disclosure, corresponding to the method mentioned above, a system for identifying triggering information is further provided. As shown in FIG. 11, the system includes: an SCS 31, an MTC-IWF 32 and a user equipment 33.

The SCS 31 is configured to contain triggering identification in triggering information, and send the triggering information to the MTC-IWF 32.

In an example embodiment, the SCS 31 is configured to set triggering information content, and send the triggering information to the MTC-IWF 32. The triggering identification may be any of the following: one or more application port identifications, one or more protocol identifications, and one or more application identifications.

The MTC device triggering information content may include: an MTC device external ID, triggering identification and an MTC device trigger validity period. Furthermore, the MTC device triggering information content may further include at least one of the following: the priority of the MTC device triggering information, an MTC server SCS identification, an MTC device trigger reference number, an MTC triggering payload, etc.

The MTC-IWF 32 is configured to judge whether received information is triggering information, and send the received triggering information to the user equipment 33.

In an example embodiment, the MTC-IWF 32 may be configured to receive triggering information, select a method for sending triggering information (for example, select a path for sending the triggering information), and send the triggering information to the user equipment 33. The MTC-IWF 32 is further configured to, after a success or a failure to send the triggering information, send a triggering success or failure (including a failure reason) message to the SCS 31.

The user equipment 33 is configured to receive triggering information, judge whether the received information is triggering information, and forward the triggering information to one or more corresponding applications for processing according to the triggering identification. In practical applications, the user equipment 33 is also configured to process the information when it is judged that the received information is not triggering information.

In the embodiment of the disclosure, as shown in FIG. 11, the user equipment 33 includes: a receiving element 331 and a forwarding element 332. The receiving element 331 is configured to receive MTC device triggering information sent by the MTC-IWF 32, judge whether the received information is triggering information, and read triggering information content. The sending element 332 is configured to forward the triggering information to one or more corresponding applications for processing according to the triggering identification.

The user equipment in the embodiments of the disclosure may be a user equipment with an MTC function. The implementation process and principle of the method of the embodiments of the disclosure will be described in detail below in conjunction with specific examples.

Example 1

Figure 12:
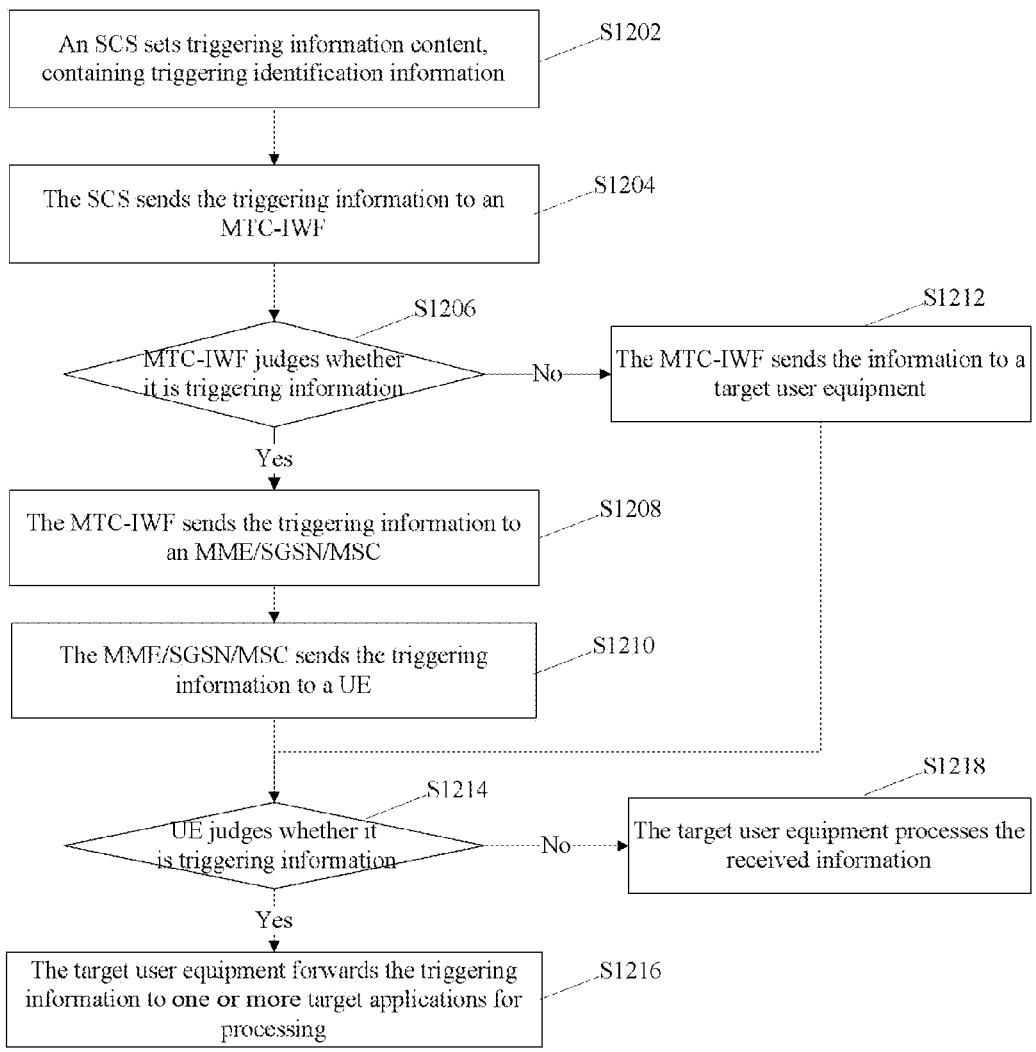
FIG. 12 is a flowchart of a method for identifying MTC device triggering information according to example I of the disclosure.

This example mainly discusses the implementation of a method for identifying MTC device triggering information in a scenario of sending MTC device triggering information via a T5 interface. As shown in FIG. 12, the method includes step S1202 to step S1218.

Step S1202, an MTC server SCS sets MTC device triggering information content.

In this step, the triggering information contains indication information, e.g., one or more protocol identifications, and/or one or more application identifications. The MTC device triggering information content includes: an MTC device identification, an MTC device trigger validity period and the triggering identification.

Furthermore, the MTC device triggering information content further includes at least one of the following: the priority of the MTC device triggering information, an MTC server ID, an MTC device trigger counting, an MTC triggering payload, etc.

Step S1204, the MTC server sends the MTC device triggering information to an MTC-IWF.

Specifically, the MTC server sends the MTC device triggering information to the MTC-IWF via a Tsp interface; and the MTC device triggering information is borne by control signalling on the Tsp interface.

Step S1206, the MTC-IWF judges whether the received information is triggering information; if so, turn to step S1208; otherwise, turn to step S1212.

Step S1208, the MTC-IWF sends the MTC device triggering information to an MME/SGSN/MSC.

Specifically, the MTC-IWF changes an external identification of the MTC device in the MTC device triggering information into an internal identification IMSI of a 3GPP network, and obtains a serving MME/SGSN/MSC of a target user equipment via HSS/HLR query. The MTC-IWF and the HSS/HLR have a communication interface S6m established therebetween.

In this step, the MTC-IWF sends triggering information via a T5 interface, and specifically, sends the triggering information to the MME via T5a, sends the triggering information to the SGSN via T5b, and sends the triggering information to the MSC via T5c. If the MTC-IWF has known the location where the target UE registers, the triggering information is sent via a corresponding interface, and otherwise, the triggering information may be sent via the three interfaces mentioned above.

When the MTC-IWF fails to send the MTC device triggering information to the MME/SGSN/MSC, the MTC-IWF re-sends the MTC device triggering information. It needs to be noted that before the MTC-IWF re-sends the MTC device triggering information, the MTC-IWF judges whether the MTC device trigger validity period has expired, and if so, the MTC-IWF stops re-sending, deletes the MTC device triggering information record, and notifies the MTC server that the triggering information fails to be sent. After the triggering information fails to be sent via T5, the MTC server may choose to send the triggering information via T4.

Step S1210, the MME/SGSN/MSC sends the triggering information to a user equipment.

The MME-SGSN-MSC may send the triggering information to a user equipment by means of a NAS message or a short message. In an example embodiment, the user equipment may be a user equipment configured with an MTC supportive function.

Furthermore, when the MME/SGSN/MSC fails to send the MTC device triggering information to the UE, for example, when the MTC device triggering information fails to be sent due to network congestion/overload, the MME/SGSN/MSC re-sends the MTC device triggering information. Before the MME/SGSN/MSC re-sends the MTC device triggering information, the MME/SGSN/MSC judges whether the MTC device trigger validity period has expired, and if so, the MME/SGSN/MSC stops re-sending, deletes the MTC device triggering information record, and notifies the MTC-IWF. Furthermore, the MTC-IWF notifies the MTC server that the triggering information fails to be sent. After a triggering information sending failure indication is received, the MTC server may choose to send the triggering information via T4.

Step S1212, the MTC-IWF sends the information to the user equipment.

Step S1214, the target user equipment receives the triggering information, and judges whether the information is triggering information; if so, turn to step S1216; otherwise, turn to step S1218.

The user equipment judges whether the information is triggering information according to triggering identification information, wherein the triggering identification information is contained in the triggering information, which is specifically any one of the following: one or more application port identifications, one or more protocol identifications, and one or more application identifications.

Step S1216, the user equipment forwards the triggering information to an application for processing, and the flow ends.

The UE receives the triggering information, and sends an acknowledgement message to the MTC server; and the UE reads the content in the triggering information.

The target user equipment forwards the triggering information to one or more target applications according to triggering identification in the triggering information content. The application above may be MTC application or non-MTC application. The one or more corresponding applications perform processing according to the content of the triggering information, such as generating application data, or performing communication with an MTC application server AS.

Step S1218, the user equipment processes the received information, and the flow ends.

In an example embodiment, if the information is not triggering information, the user equipment performs corresponding processing according to the information content.

Example 2

Figure 13:
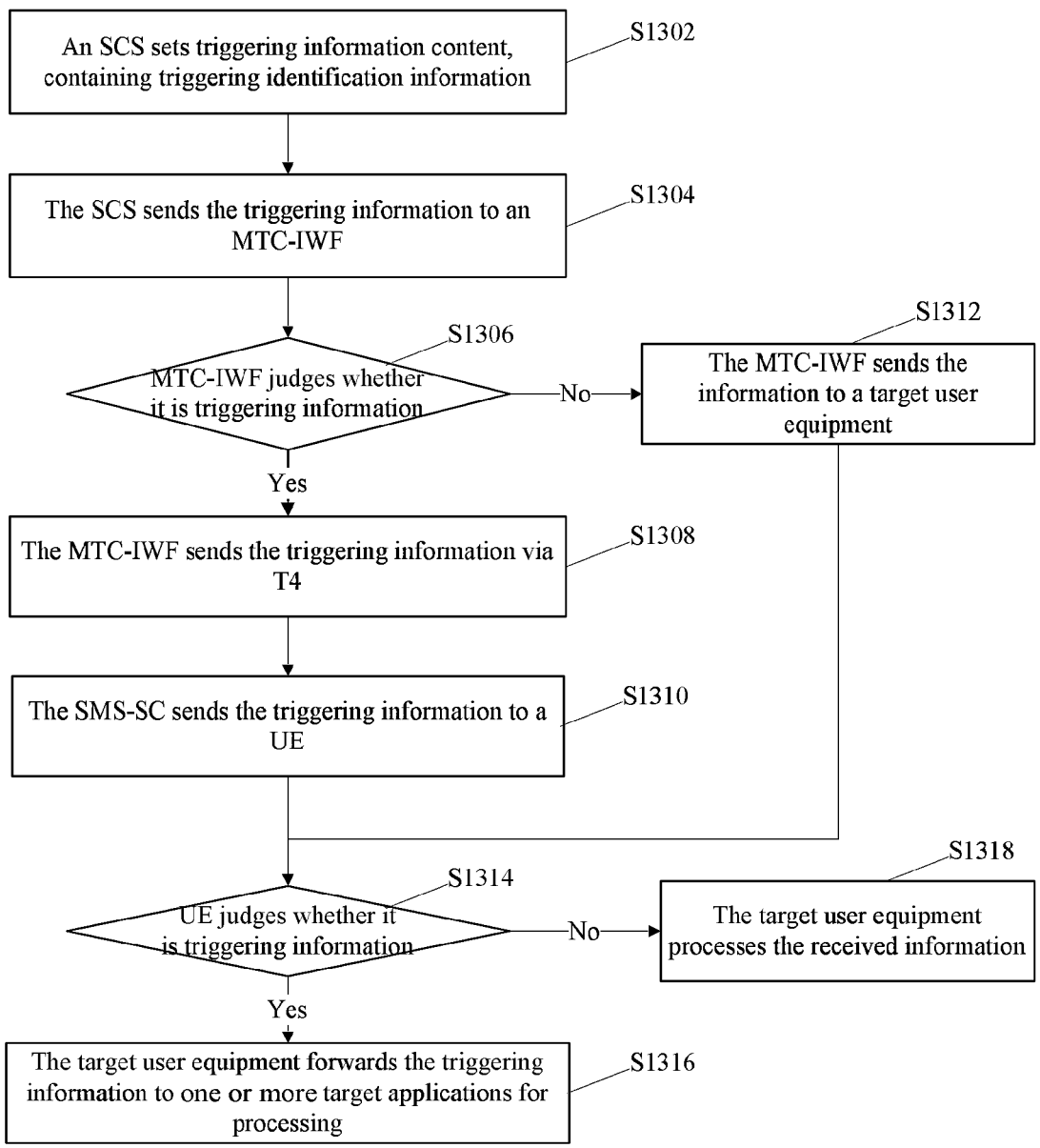
FIG. 13 is a flowchart of a method for identifying MTC device triggering information according to example II of the disclosure.

This example discusses the implementation of a method for sending MTC device triggering information in a scenario of sending MTC device triggering information via a T4 interface. As shown in FIG. 13, the method includes step S1302 to step S1318.

Step S1302, an MTC server sets MTC device triggering information content.

This step is the same as step S1202, and will no longer be described herein redundantly.

Step S1304, the MTC server sends the MTC device triggering information to an MTC-IWF.

This step is the same as step S1204, and will no longer be described herein redundantly.

Step S1306, the MTC-IWF judges whether the received information is triggering information; if so, turn to step S1308; otherwise, turn to step S1312.

This step is the same as step S1206, and will no longer be described herein redundantly.

Step S1308, the MTC-IWF sends the triggering information via T4. The MTC-IWF sends the triggering information to an SMS-SC via T4.

Step S1310, the SMS-SC receives the triggering information via T4, and forwards the triggering information to a target user equipment.

The SMS-SC receives the triggering information sent by the MTC-IWF via T4, and the SMS-SC sends the triggering information to a user equipment in the form of a short message.

If the SMS-SC fails to send the triggering information to the user equipment, then the SMS-SC re-sends the triggering information to the user equipment within a valid time; otherwise, the SMS-SC sends a triggering information sending failure indication to the MTC-IWF. After receiving the indication, the MTC-IWF re-sends the triggering information to the SMS-SC within a valid time; otherwise, the MTC-IWF sends a trigger failure indication to the MTC server, and the MTC server re-sends the triggering information according to the failure indication.

It needs to be noted that with regard to an MSISDN-less scenario, MSISDN-less refers to the scenario where an SMS is sent via an IP (at this time an IMS-IP multimedia subsystem is deployed in the network), and the SMS-SC may send SMS triggering information via an IP-SM-GW.

Step S1312, the MTC-IWF sends the information to the user equipment.

Step S1314, the target user equipment receives the MTC device triggering information, and judges whether the information is triggering information; if so, turn to step S1316; otherwise, turn to step S1318.

The judgement is performed according to triggering identification information in the short message. The triggering identification information is any one of the following: one or more application port identifications, one or more protocol identifications, and one or more application identifications.

Step S1316, the user equipment forwards the triggering information to one or more target applications for processing, and the flow ends.

The UE receives the triggering information, and sends an acknowledgement message to the MTC server; the UE reads the content in the triggering information. If the UE fails to receive the triggering information since, e.g. the UE memory is full, a trigger failure message is sent to the MTC server.

The target user equipment forwards the triggering information to one or more target applications according to triggering identification in the MTC device triggering information content. The application above may be an MTC application or a non-MTC application. The one or more corresponding applications perform processing according to the content of the triggering information, such as generating application data, or performing communication with an MTC application server AS.

Step S1318, the user equipment processes the received information, and the flow ends. If the information is not triggering information, the user equipment performs corresponding processing according to the information content.

Example 3

Figure 14:
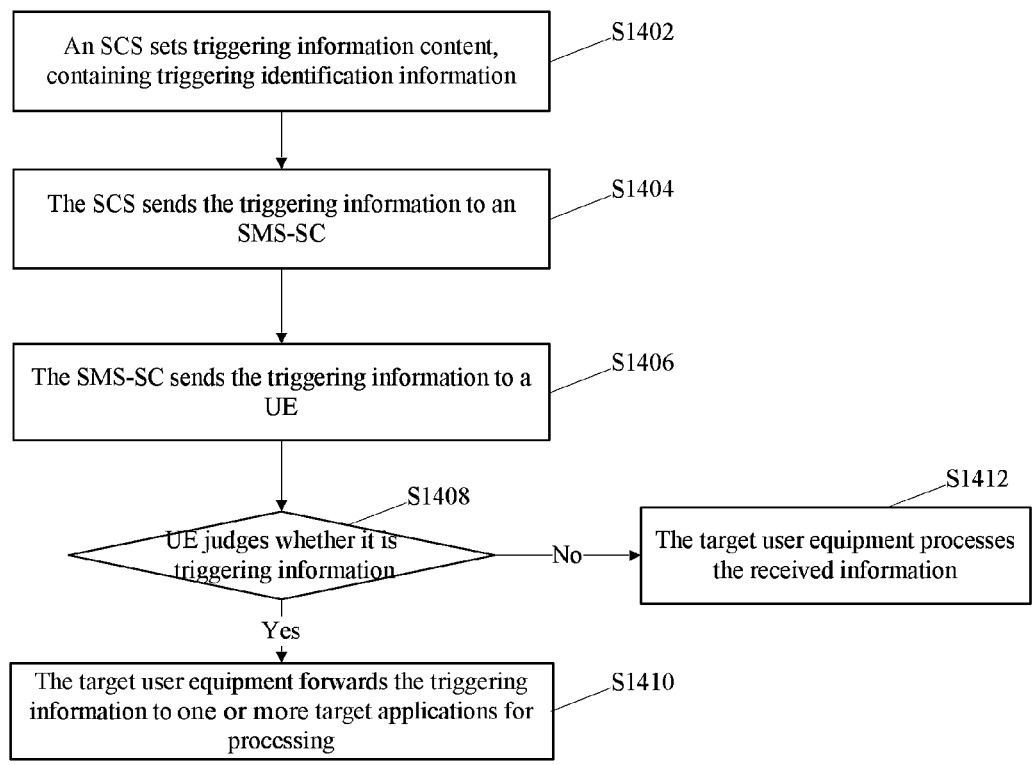
FIG. 14 is a flowchart of a method for identifying MTC device triggering information according to example III of the disclosure.

This example discusses the implementation of a method for identifying MTC device triggering information in a scenario of sending MTC device triggering information via a Tsms interface. As shown in FIG. 14, the method includes step S1402 to step S1412.

Step S1401, a short message entity (SME) sets MTC device triggering information content.

The SME sets to generate SMS triggering information. The SME in this step functions identically with the SCS in step S1202, and will no longer be described herein redundantly.

Step S1402, the SME sends the MTC device triggering information to an SMS-SC.

In an example embodiment, the triggering information is sent to the SMS-SC via a Tsms interface.

Step S1406, the SMS-SC forwards the triggering information to a target user equipment.

The SMS-SC sends the triggering information to the user equipment by means of a short message. The triggering information is forwarded to the UE via other network nodes, wherein the above-mentioned other network nodes may include one or more of the following: a GMSC, an SMS-Router, an MSC/VLR, an SGSN, and an MME.

If the SMS-SC fails to send the triggering information to the user equipment, then the SMS-SC re-sends the triggering information to the user equipment within a valid time; otherwise, the SMS-SC sends a triggering information sending failure indication to the MTC-IWF. After receiving the indication, the MTC-IWF re-sends the triggering information to the SMS-SC within a valid time; otherwise, the MTC-IWF sends a trigger failure indication to the MTC server, and the MTC server re-sends the triggering information according to the failure indication.

Step S1408, the target user equipment receives the MTC device triggering information, and judges whether the information is triggering information; if so, turn to step S1410; otherwise, turn to step S1412.

This step is the same as step S1316, and will no longer be described herein redundantly.

Step S1410, the user equipment forwards the triggering information to one or more target applications for processing, and the flow ends.

The UE receives the triggering information, and sends an acknowledgement message to the SME. The UE reads the content contained in an application information container in the triggering information. If the UE fails to receive the triggering information since, e.g. the UE memory is full, a trigger failure message is sent to the SME.

The target user equipment forwards the triggering information to the one or more target applications according to triggering identification in the triggering information content. The application above may be an MTC application or a non-MTC application. The one or more corresponding applications perform processing according to the content of the triggering information, such as generating application data, or performing communication with the SME.

Step S1412, the user equipment processes the received information, and the flow ends. If the information is not triggering information, the user equipment performs corresponding processing according to the information content.

It can be seen from the above description that the following technical effects are implemented by means of the embodiments of the disclosure: an MTC server contains triggering identification in triggering information, and sends the triggering information to an MTC-IWF; the MTC-IWF determines that the information is triggering information according to the triggering identification, and forwards the triggering information to a target user equipment; and the target user equipment receives the triggering information, and forwards the triggering information to one or more corresponding applications for processing according to the triggering identification information. Different application triggering information can be distinguished, thereby implementing the identification of the triggering information by the MTC-IWF and the user equipment, and determining the schemes for processing the triggering information by the MTC-IWF and the user equipment.

Obviously, those skilled in the art should know that each of the mentioned components or steps of the disclosure can be realized by universal computing devices; the components or steps can be focused on single computing device, or distributed on the network formed by multiple computing devices; selectively, they can be realized by the program codes which can be executed by the computing device; therefore, the components or steps can be stored in the storage device and executed by the computing device; and under some circumstances, the shown or described steps can be executed in different orders, or can be independently manufactured as each integrated circuit component, or multiple components or steps thereof can be manufactured to be single integrated circuit component, thus to be realized. In this way, the disclosure is not restricted to any particular hardware and software combination.

The descriptions above are only example embodiments of the disclosure, which are not used to restrict the disclosure, for those skilled in the art, the disclosure may have various changes and variations. All modifications, equivalents and improvements, which are made within the principle of the disclosure, should be included in the protection scope defined by the claims of the disclosure.

What is claimed is:

1. A method for sending information, comprising:
   adding, by a machine type communication (MTC) server or a short message entity (SME), triggering identification to information, wherein the triggering identification is used for indicating that the information is triggering information;
   sending, by the MTC server or the SME, the information to a user equipment; and
   determining, by a network filtering element, whether the MTC server or the SME sending the information has authorized sending the triggering information, wherein information indicated by the triggering identification further comprising:
   indicating an application type triggered by the information, wherein the application type comprises: MTC application and non-MTC application;
   indicating one or more applications triggered by the information; and
   indicating to trigger charging.

2. The method according to claim 1, wherein the triggering identification comprises at least one of the following:
   one or more application port number identifications of one or more applications triggered by the information;
   one or more protocol identifications of one or more applications triggered by the information; and
   one or more application identifications of one or more applications triggered by the information.

3. The method according to claim 2, further comprising:
receiving, by the user equipment, the information; and
processing, by the user equipment, the information according to the triggering identification.

4. The method according to claim 3, wherein processing, by the user equipment, the information according to the triggering identification comprises:
sending, by the user equipment, the information to one or more applications corresponding to the information according to the triggering identification; and
conducting, by the user equipment, communication with the MTC server or the SME according to the triggering information carried in the information.

5. The method according to claim 1, wherein sending, by the MTC server, the information to the user equipment comprises:
sending, by the MTC server, the information to a machine type communication-interworking function (MTC-IWF) by carrying the information in a short message or control plane signalling;
determining, by the MTC-IWF, that the information is triggering information; and
sending, by the MTC-IWF, the information to the user equipment via a T4 interface and/or a T5 interface.

6. The method according to claim 1, wherein sending, by the SME, the information to the user equipment comprises:
sending, by the SME, the information to the user equipment via a Tsms interface by carrying the information in a short message.

7. The method according to claim 1, further comprising:
receiving, by the user equipment, the information; and
processing, by the user equipment, the information according to the triggering identification.

8. The method according to claim 7, wherein processing, by the user equipment, the information according to the triggering identification comprises:
sending, by the user equipment, the information to one or more applications corresponding to the information according to the triggering identification; and
conducting, by the user equipment, communication with the MTC server or the SME according to the triggering information carried in the information.

9. The method according to claim 1, wherein the triggering identification comprises at least one of the following:
one or more application port number identifications of one or more applications triggered by the information;
one or more protocol identifications of one or more applications triggered by the information; and
one or more application identifications of one or more applications triggered by the information.

10. The method according to claim 9, further comprising:
receiving, by the user equipment, the information; and
processing, by the user equipment, the information according to the triggering identification.

11. The method according to claim 1, further comprising:
receiving, by the user equipment, the information; and
processing, by the user equipment, the information according to the triggering identification.

12. The method according to claim 11, wherein processing, by the user equipment, the information according to the triggering identification comprises:
sending, by the user equipment, the information to one or more applications corresponding to the information according to the triggering identification; and
conducting, by the user equipment, communication with the MTC server or the SME according to the triggering information carried in the information.

13. A method for forwarding information, comprising:
receiving, by a machine type communication-interworking function (MTC-IWF), information carrying triggering identification, wherein the triggering identification is used for indicating that the information is triggering information;
determining, by the MTC-IWF, that the information is triggering information according to the triggering identification; and
forwarding, by the MTC-IWF, the information to a network filtering element, wherein the network filtering element is configured to determine whether a machine type communication (MTC) server or a short message entity (SME) sending the information has authorized sending the triggering information, wherein information indicated by the triggering identification further comprises at least one of the following:
indicating an application type triggered by the information, wherein the application type comprises: MTC application and non-MTC application;
indicating one or more applications triggered by the information; and
indicating to trigger charging.

14. The method according to claim 13, wherein the network filtering element comprises at least one of the following: a short message service-service centre (SMS-SC), a gateway mobile switching centre (GMSC), a short message service router (SMS Router) and a dedicated network entity.

15. The method according to claim 13, wherein the triggering identification comprises at least one of the following:
one or more application port number identifications of one or more applications triggered by the information;
one or more protocol identifications of one or more applications triggered by the information; and
one or more application identifications of one or more applications triggered by the information.

16. The method according to claim 13, wherein the triggering identification comprises at least one of the following:
one or more application port number identifications of one or more applications triggered by the information;
one or more protocol identifications of one or more applications triggered by the information; and
one or more application identifications of one or more applications triggered by the information.

17. A user equipment, comprising:
a determining component to determine, according to triggering identification carried in received information, that the information is triggering information; and
a forwarding component to forward the information to one or more applications on the user equipment according to the triggering identification, wherein an application type comprises: MTC application and non-MTC application;
a network filtering element to determine whether the MTC server or the SME sending the information has authorized sending the triggering information, wherein information indicated by the triggering identification further comprises at least one of the following:
indicating an application type triggered by the information, wherein the application type comprises: MTC application and non-MTC application;
indicating one or more applications triggered by the information; and
indicating to trigger charging.

18. The user equipment according to claim 17, wherein the forwarding component comprises:
   a first forwarding element to forward the information to an application type indicated by the triggering identification; or
   a second forwarding element to forward the information to one or more applications indicated by the triggering identification.

\* \* \* \* \*